US007336328B2

(12) United States Patent
Wu et al.

(10) Patent No.: US 7,336,328 B2
(45) Date of Patent: Feb. 26, 2008

(54) COLOR FILTER AND LIQUID CRYSTAL DISPLAY USING THE SAME

(75) Inventors: Mei-Ling Wu, Miao-Li (TW);
Sheng-Shiou Yeh, Miao-Li (TW);
Jia-Pang Pang, Miao-Li (TW)

(73) Assignee: Innolux Display Corp., Miao-Li County (TW)

( * ) Notice: Subject to any disclaimer, the term of this patent is extended or adjusted under 35 U.S.C. 154(b) by 429 days.

(21) Appl. No.: 11/035,626

(22) Filed: Jan. 13, 2005

(65) Prior Publication Data

US 2005/0151897 A1      Jul. 14, 2005

(30) Foreign Application Priority Data

Jan. 13, 2004    (TW) ............................. 93100745 A

(51) Int. Cl.
*G02F 1/1335* (2006.01)
(52) U.S. Cl. ....................................... 349/106; 349/114
(58) Field of Classification Search ................ 349/106, 349/114

See application file for complete search history.

(56) References Cited

U.S. PATENT DOCUMENTS

| 7,098,973 | B2 * | 8/2006 | Yeh et al. ................... 349/106 |
| 7,119,864 | B2 * | 10/2006 | Jang et al. ................. 349/114 |
| 7,148,938 | B2 * | 12/2006 | Nakamura et al. .......... 349/106 |

FOREIGN PATENT DOCUMENTS

CN              1360220 A        7/2002

* cited by examiner

*Primary Examiner*—Mike Qi
(74) *Attorney, Agent, or Firm*—Wei Te Chung

(57) ABSTRACT

A color filter (100) includes pixels (110), each pixel including three sub-pixels (111), and each sub-pixel including a reflection section (R) and a transmission section (T). In each pixel, the transmission sections and the reflection sections are alternately arranged along each row of the sections and along each column of the sections. The alternating arrangement of the transmission sections and the reflection sections of the pixels can provide a uniform pattern of hue balance over the whole display area. Furthermore, in various embodiments described, different optical thicknesses of the transmission sections and the reflection sections (or color layers of the reflection sections) can provide uniform hue over the whole display area.

14 Claims, 5 Drawing Sheets

COLOR FILTER AND LIQUID CRYSTAL DISPLAY USING THE SAME

BACKGROUND OF THE INVENTION

1. Field of the Invention

The present invention relates to color filters, and especially to color filters used in display devices such as liquid crystal display devices.

2. Description of the Prior Art

Liquid crystal display devices have become very popular in recent years because of their advantages over display devices that utilize cathode ray tubes. In particular, liquid crystal display devices are thinner, and offer lower power consumption.

Liquid crystal display devices are generally divided into three types according to the way in which they utilize available light: transmissive type, reflective type, and transflective type.

A transflective liquid crystal display device has the functions of both a transmissive and a reflective liquid crystal display device, and has received much attention lately. The transflective liquid crystal display device reflects ambient light when it is used in a bright ambient environment, and at this time the transflective liquid crystal display device does not need to use its backlight. Thus, the transflective liquid crystal display device has lower power consumption than a transmissive liquid crystal display device. On the other hand, when the intensity of light in the ambient environment is low, the transflective liquid crystal display device can use light beams both from the backlight and from the ambient environment. Therefore, at this time the transflective liquid crystal display device exhibits a higher light intensity than a reflective liquid crystal display device.

Referring to FIG. 11, a color filter 1 applied in a transflective display device of the prior art is shown. The color filter 1 comprises a multiplicity of pixels 10 arranged in a regular, rectangular array of rows and columns. Each pixel 10 comprises three sub-pixels 10A, 10B, 10C of Red, Green and Blue pigment respectively, the sub-pixels 10A, 10B, 10C being arranged in a row. Each sub-pixel 10A, 10B, 10C comprises a transmission sub-section 102, and a reflection sub-section 101 above the transmission sub-section 102.

FIG. 12 shows a display effect of the transflective liquid crystal display operating in a transmission/reflection mode. Whether the transflective liquid crystal display is used in a bright environment or in a low light intensity environment, the color filter 1 causes the transflective display device to exhibit hue diversity. This reduces the quality of the displayed image.

Further, in operation, the light beams from the ambient environment sequentially pass through the reflection sections 101 twice, and the light beams from the backlight pass through the transmission sections 102 only once. The optical paths of the light beams passing through the reflection sections 101 are twice as long as the optical paths of the light beams passing through the transmission sections 102. This causes the transflective display device to exhibit hue diversity. That is, the light intensity, contrast and saturation are not uniform. This further reduces the quality of the displayed image.

Therefore, it is desired to provide a color filter and a display device using the same which overcome the above-described disadvantages of the prior art.

SUMMARY OF THE INVENTION

An object of the present invention is to provide a color filter which has reduced or no hue diversity.

Another object of the present invention is to provide a display device adopting the above-described color filter.

To achieve the first above-described object, a color filter of the present invention comprises a multiplicity of pixels. Each pixel comprises three sub-pixels, and each sub-pixel comprises a reflection section and a transmission section. In each pixel, the transmission sections and the reflection sections are alternately arranged along each row of the sections and along each column of the sections.

To achieve the second above-described object, a display device of the present invention comprises a color filter layer located on one of two opposite substrates. The color filter layer comprises a plurality of pixels. Each pixel comprises three sub-pixels, and each sub-pixel comprises a reflection section and a transmission section. In each pixel, the transmission sections and the reflection sections are alternately arranged along each row of the sections and along each column of the sections.

The alternating arrangement of the transmission sections and the reflection sections of the pixels can eliminate the strip-shaped hue diversity of the prior art, and can provide a uniform pattern of hue balance over the whole display area. Furthermore, in various sub-embodiments of the present invention, different optical thicknesses of the transmission sections and the reflection sections (or color layers of the reflection sections) can make the lengths of all optical paths in the color filter uniform. This avoids the light intensity, contrast and saturation hue diversity of the prior art, and can provide uniform hue over the whole display area.

Other objects, advantages, and novel features of the present invention will be apparent from the following detailed description of preferred embodiments thereof with reference to the attached drawings.

DETAILED DESCRIPTION OF THE PRESENT INVENTION

Figure 1:
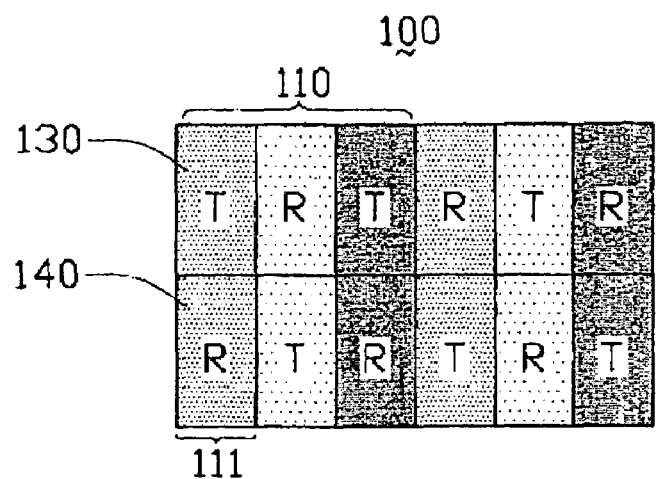
FIG. 1 is a schematic, top view of two adjacent pixels of a color filter in accordance with a first preferred embodiment of the present invention, the pixels being in accordance with a first sub-embodiment of the present invention.

Referring to FIG. 1, two adjacent pixels 110 of a color filter 100 in accordance with the first preferred embodiment of the present invention are shown, the pixels 110 being in accordance with the first sub-embodiment of the present invention. The color filter 100 includes millions of the pixels 110 arranged in a regular, rectangular array of rows and columns. Each pixel 110 comprises three sub-pixels 111 of Red, Green and Blue pigment respectively. The sub-pixels 111 are arranged in a row. Each sub-pixel 111 comprises two sections arranged one above the other. Thus, each pixel 110 comprises an array of two rows and three columns of sections. Each section is either a transmission ("T") section 130 or a reflection ("R") section 140. In each pixel 110, the transmission sections 130 and the reflection sections 140 are alternately arranged along each row and along each column. Further, in the overall array of pixels 110, the transmission sections 130 and the reflection sections 140 are alternately arranged along each row of sections and along each column of sections.

Figure 2:
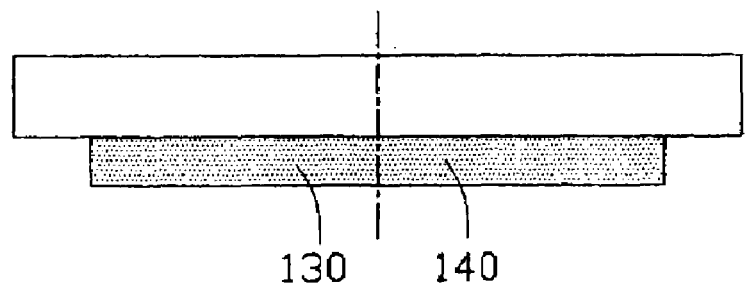
FIG. 2 is essentially a schematic, left side view of the two pixels of FIG. 1 adjoining a top substrate, with only one sub-pixel of one of the pixels being visible.

FIG. 2 is essentially a schematic, left side view of the two pixels 110 of FIG. 1 adjoining a top substrate. Only one sub-pixel 111 of one of the pixels 110 is visible. A thickness and a material of the transmission section 130 and the reflection section 140 are the same.

Figure 3:
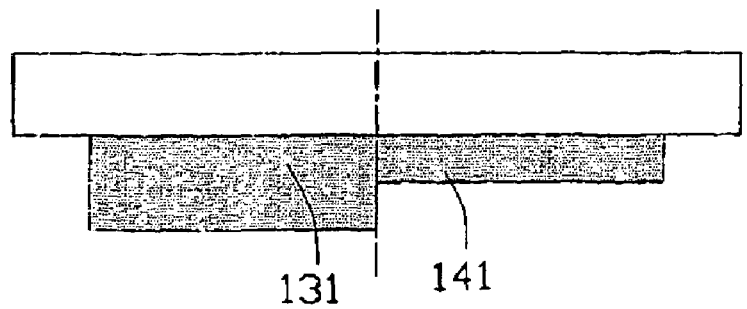
FIG. 3 is similar to FIG. 2, but showing one sub-pixel in accordance with a second sub-embodiment of the present invention.

FIG. 3 is essentially a schematic, side view showing one sub-pixel 111 of the color filter 100, but the sub-pixel 111 being in accordance with the second sub-embodiment of the present invention. A reflection section 141 of each sub-pixel 111 is thinner than a transmission section 131 of the sub-pixel 111. Preferably, the thickness of the reflection section 141 is half that of the transmission section 131.

Figure 4:
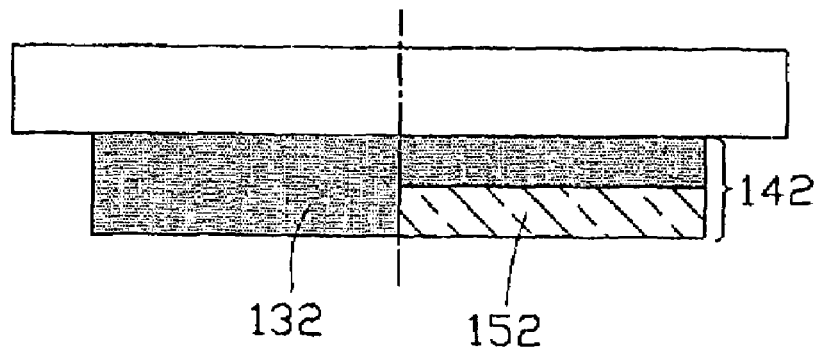
FIG. 4 is similar to FIG. 2, but showing one sub-pixel in accordance with a third sub-embodiment of the present invention.

FIG. 4 is essentially a schematic, side view showing one sub-pixel 111 of the color filter 100, but the sub-pixel 111 being in accordance with the third sub-embodiment of the present invention. A material of a transmission section 132 of each sub-pixel 111 and a material of a color layer (not labeled) of a reflection section 142 of the sub-pixel 111 are the same. A thickness of the color layer is less than that of the transmission section 132. Preferably, the thickness of the color layer is half that of the transmission section 132. The reflection section 142 further comprises a transparent layer 152 coated on the color layer distal from the substrate, so that a thickness of the reflection section 142 is the same as the thickness of the transmission section 132.

Figure 5:
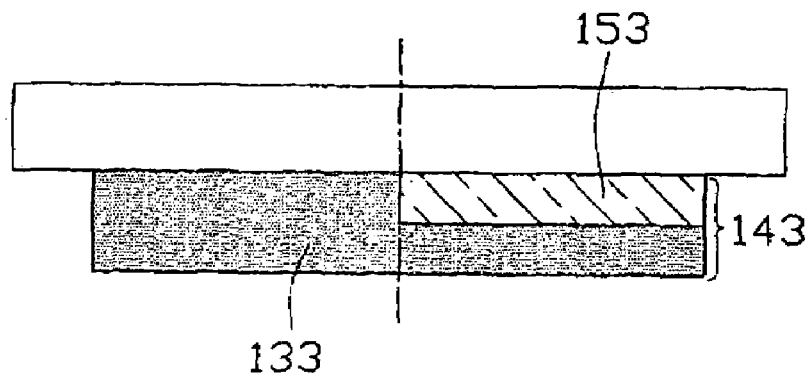
FIG. 5 is similar to FIG. 2, but showing one sub-pixel in accordance with a fourth sub-embodiment of the present invention.

FIG. 5 is essentially a schematic, side view showing one sub-pixel 111 of the color filter 100, but the sub-pixel 111 being in accordance with the fourth sub-embodiment of the present invention. The sub-pixel 111 has a structure similar to that of the sub-pixel 111 of the third sub-embodiment shown in FIG. 4. A material of a transmission section 133 of each sub-pixel 111 and a material of a color layer (not labeled) of a reflection section 143 of the sub-pixel 111 are the same. A thickness of the color layer is less than that of the transmission section 133. Preferably, the thickness of the color layer is half that of the transmission section 133. The reflection section 143 further comprises a transparent layer 153 coated on the substrate and thereby sandwiched between the substrate and the color layer. Thus a thickness of the reflection section 143 is the same as the thickness of the transmission section 133.

Figure 6:
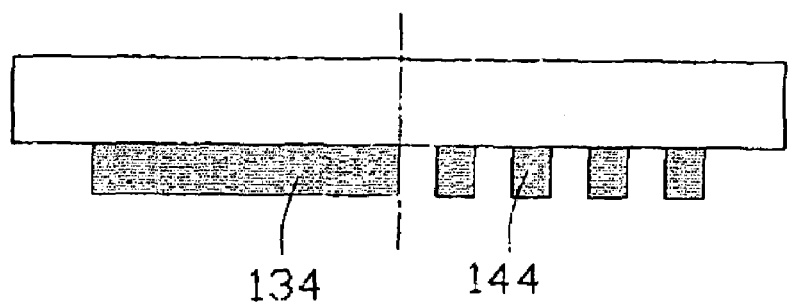
FIG. 6 is similar to FIG. 2, but showing one sub-pixel in accordance with a fifth sub-embodiment of the present invention.

FIG. 6 is essentially a schematic, side view showing one sub-pixel 111 of the color filter 100, but the sub-pixel 111 being in accordance with the fifth sub-embodiment of the present invention. Each sub-pixel 111 comprises a reflection section 144 and a transmission section 134. The reflection section 144 defines a plurality of holes, or alternatively a plurality of recessed structures. A material of the transmission section 134 and a material of the reflection section 144 are the same.

In all the above-described second through fifth sub-embodiments of the sub-pixels 111 of the pixels 110 of the color filter 100, when light beams from the ambient environment and light beams from a backlight respectively pass through the reflection sections and the transmission sections, the distances traveled by all the light beams through the color filter 100 are substantially the same. This can eliminate any display hue differences that may occur in the color filter 100 that has sub-pixels 111 according to the above-described first sub-embodiment.

Figure 7:
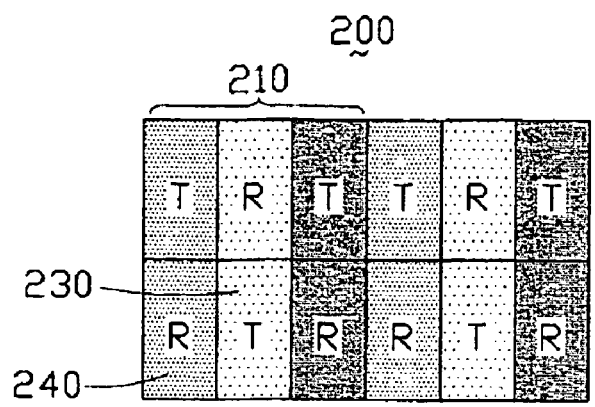
FIG. 7 is a schematic, top view of two adjacent pixels of a color filter in accordance with a second preferred embodiment of the present invention.

FIG. 7 shows two adjacent pixels 210 of a color filter 200 in accordance with the second preferred embodiment of the present invention. The color filter 200 has a structure similar to that of the color filter 100 of the first preferred embodiment, except for the arrangement of the pixels 210. Each pixel 210 comprises an array of two rows and three columns of sections. Each section is either a transmission ("T") section 230 or a reflection ("R") section 240. Each two adjacent pixels 210 in a same row in the array of pixels 210 adjoin each other at a T-T pair of transmission sections 230 in a first row of sections of the adjacent pixels 210, and at an R-R pair of reflection sections 240 in a second row of sections of the adjacent pixels 210.

Figure 8:
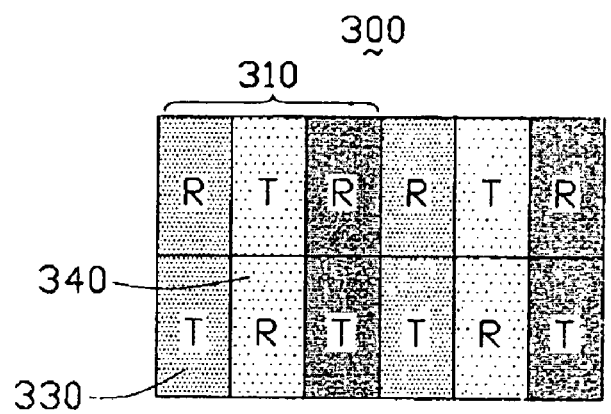
FIG. 8 is a schematic, top view of two adjacent pixels of a color filter in accordance with a third preferred embodiment of the present invention.

FIG. 8 shows two adjacent pixels 310 of a color filter 300 in accordance with the third preferred embodiment of the present invention. The color filter 300 has a structure similar to that of the color filter 200 of the second preferred embodiment, except for the arrangement of the pixels 310. Each pixel 310 comprises an array of two rows and three columns of sections. Each section is either a transmission ("T") section 330 or a reflection ("R") section 340. Each two adjacent pixels 310 in a same row in the array of pixels 310 adjoin each other at an R-R pair of reflection sections 340 in a first row of sections of the adjacent pixels 310, and at a T-T pair of transmission sections 330 in a second row of sections of the adjacent pixels 310.

In alternative embodiments, the materials of the transmission sections and the reflection sections may be different. For example, the material of the transmission sections may have a relatively high hue saturation, and the material of the reflection sections may have a relatively low hue saturation.

Figure 9:
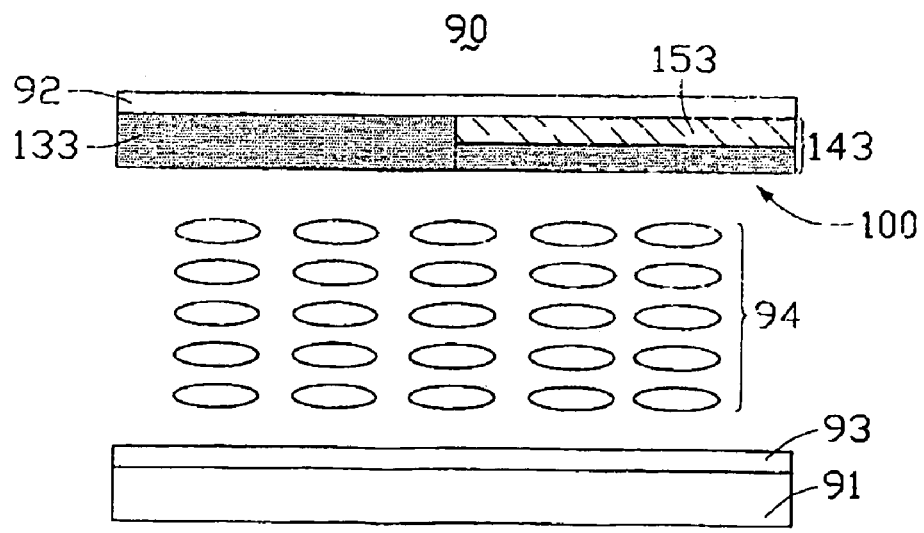
FIG. 9 is a schematic cross-sectional view of part of a liquid crystal display device incorporating the color filter in accordance with the first preferred embodiment of the present invention, the color filter comprising pixels in accordance with the fourth sub-embodiment of the present invention.

FIG. 9 shows a schematic, side cross-sectional view of part of a liquid crystal display device 90 incorporating the color filter 100 in accordance with the first preferred embodiment of the present invention, the color filter 100 comprising pixels 110 in accordance with the fourth sub-embodiment of the present invention (see FIG. 5). The liquid crystal display device 90 comprises a bottom substrate 91, an opposite top substrate 92, and a liquid crystal layer 94 sandwiched between the two substrates 91, 92. The color filter 100 is arranged on a bottom surface of the top substrate 92, and an electrode layer 93 is located on a top surface of the bottom substrate 91. Each sub-pixel 111 of each pixel 110 of the color filter 100 comprises the transmission section 133 and the reflection section 143. The reflection section 143 comprises the color layer (not labeled), and the transparent layer 153 sandwiched between the color layer and the top substrate 92. The electrode layer 93 comprises a transmission portion (not shown) and a reflection portion (not shown), which are located opposite to the transmission section 133 and the reflection section 143 of the color filter 400 respectively.

Figure 10:
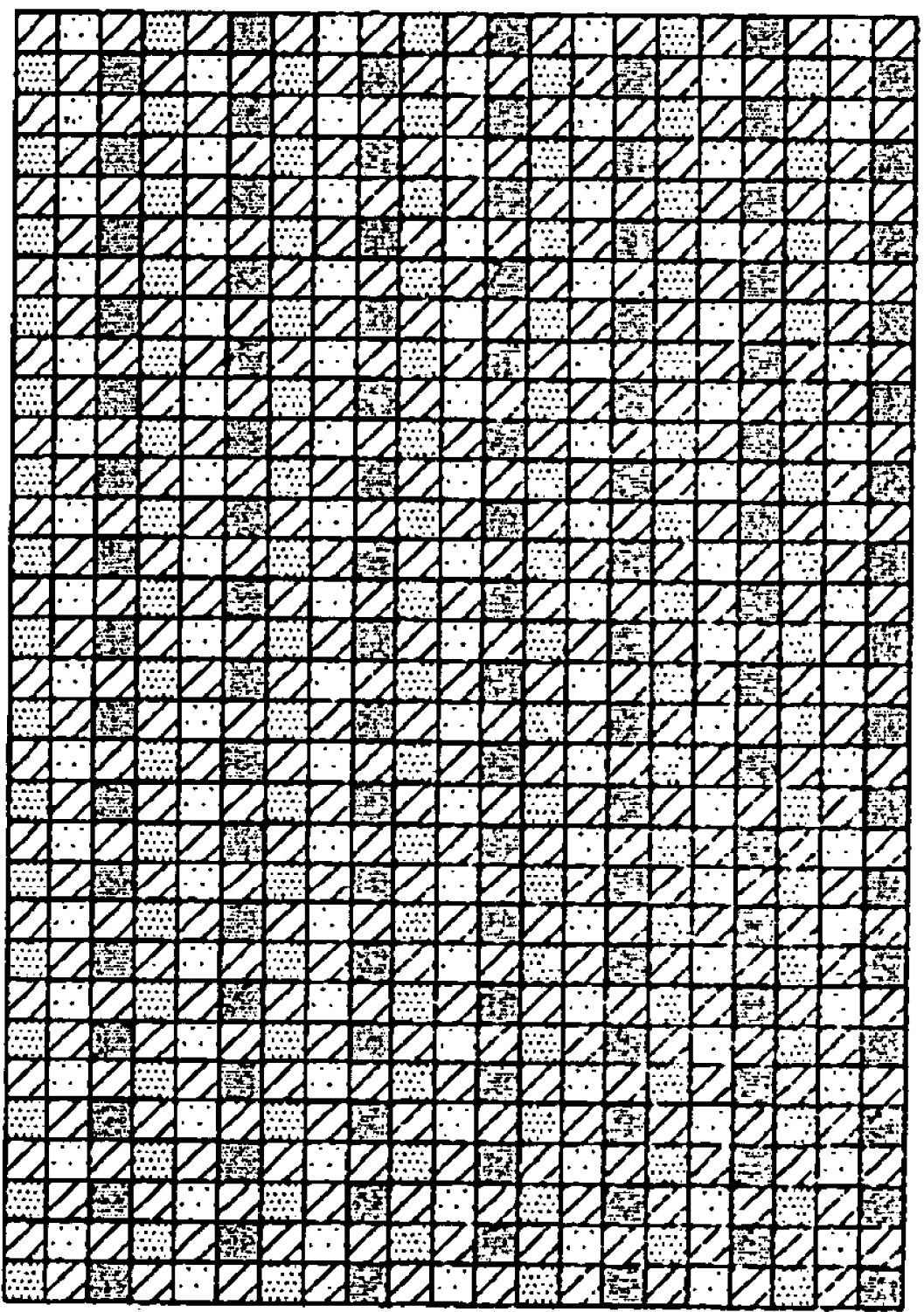
FIG. 10 is a schematic view of a display effect of the liquid crystal display device of FIG. 9.
Figure 11:
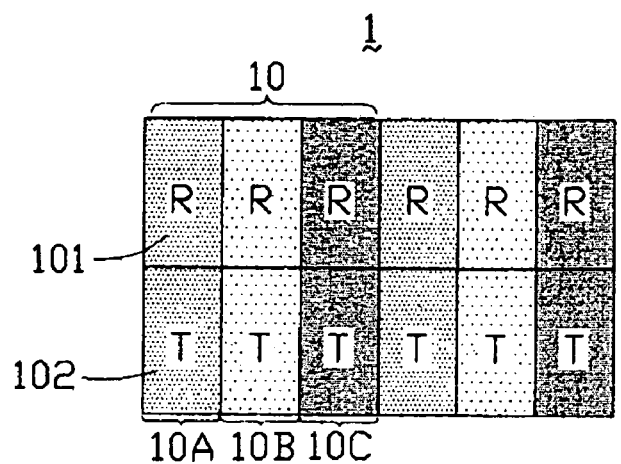
FIG. 11 is a schematic, top view of two adjacent pixels of a conventional color filter applied in a transflective display device.
Figure 12:
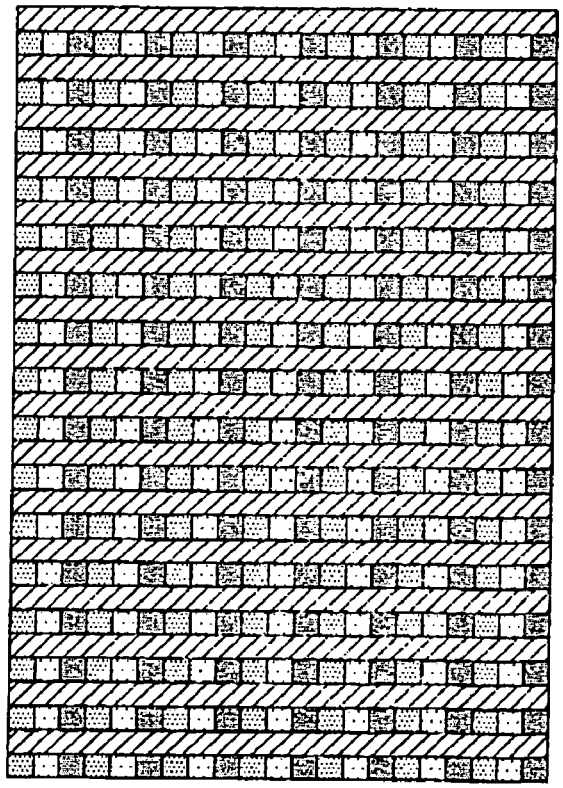
FIG. 12 is a schematic view of a display effect of the transflective display device adopting the color filter of FIG. 11.

FIG. 10 shows a display effect of the liquid crystal display device 90 operating in a transmission or a reflection mode. By virtue of the transmission sections 133 and the reflection sections 143 of the sub-pixels 111 of the color filter 100 being alternately arranged along each row of sections and along each column of sections in the array of pixels 110, the liquid crystal display device 90 can eliminate hue diversity that is present in the transmission or reflection modes of liquid crystal display devices of the prior art.

According to the present invention, the alternating arrangement of the transmission sections and the reflection sections of the pixels can eliminate the obvious strip-shaped hue diversity of the prior art, and can provide a uniform pattern of hue balance over the whole display area. Furthermore, as regards the second through fifth sub-embodiments, the different optical thicknesses of the transmission sections and the reflection sections (or the color layers of the reflection sections) can make the lengths of all optical paths in the color filter uniform. This avoids the light intensity, contrast and saturation hue diversity of the prior art, and can provide uniform hue over the whole display area.

It is to be understood, however, that even though numerous characteristics and advantages of the present invention have been set out in the foregoing description, together with details of the structure and function of the invention, the disclosure is illustrative only, and changes may be made in detail to the full extent indicated by the broad general meaning of the terms in which the appended claims are expressed.

What is claimed is:

1. A color filter comprising:
    a plurality of pixels, each pixel comprising three sub-pixels, and each sub-pixel comprising a reflection section and a transmission section;
    wherein in each pixel, the transmission sections and the reflection sections are alternately arranged along each row of the sections and along each column of the sections; and
    wherein each two adjacent pixels in a same row of pixels in the color filter adjoin each other at a transmission-transmission pair of the sections in a first row of the sections, and at a reflection-reflection pair of the sections in a second row of the sections.

2. The color filter as claimed in claim 1, wherein in each sub-pixel a thickness of the reflection section is less than that of the transmission section.

3. The color filter as claimed in claim 2, wherein the thickness of the reflection section is half that of the transmission section.

4. The color filter as claimed in claim 1, wherein in each sub-pixel the reflection section comprises a color layer and a transparent layer, and a thickness of the reflection section is the same as a thickness of the transmission section.

5. The color filter as claimed in claim 4, wherein the transparent layer is disposed on the color layer distal from a substrate side of the reflection section.

6. The color filter as claimed in claim 4, wherein the transparent layer is disposed on the color layer at a substrate side of the reflection section.

7. The color filter as claimed in claim 1, wherein the reflection section has a plurality of holes and/or recesses.

8. A display device comprising:
    a color filter layer located at either of two opposite substrates, the color filter layer comprising a plurality of pixels, each pixel comprising three sub-pixels, and each sub-pixel comprising a reflection section and a transmission section;
    wherein in each pixel, the transmission sections and the reflection sections are alternately arranged along each row of the sections and along each column of the sections; and
    wherein each two adjacent pixels in a same row of pixels in the color filter adjoin each other at a reflection-reflection pair of the sections in a first row of the sections, and at a transmission-transmission pair of the sections in a second row of the sections.

9. The display device as claimed in claim 8, wherein in each sub-pixel a thickness of the reflection section is less than that of the transmission section.

10. The display device as claimed in claim 9, wherein the thickness of the reflection section is half that of the transmission section.

11. The display device as claimed in claim 8, wherein in each sub-pixel the reflection section comprises a color layer and a transparent layer, and a thickness of the reflection section is the same as a thickness of the transmission section.

12. The display device as claimed in claim 11, wherein the transparent layer is disposed on the color layer distal from a substrate side of the reflection section.

13. The display device as claimed in claim 11, wherein the transparent layer is disposed on the color layer at a substrate side of the reflection section.

14. The display device as claimed in claim 8, wherein the reflection section has a plurality of holes and/or recesses.

* * * * *